Dec. 12, 1939.   D. A. BOYD   2,183,006
SEAL
Original Filed Oct. 29, 1937

INVENTOR
DONALD A. BOYD
BY
ATTORNEY

UNITED STATES PATENT OFFICE 2,183,006

SEAL

Donald A. Boyd, Detroit, Mich.

Application October 29, 1937, Serial No. 171,724
Renewed August 23, 1939

2 Claims. (Cl. 288—1)

This invention relates to a packing and more particularly to a packing member which may be inserted as a unit in a housing surrounding a centrally located shaft.

An object of the invention is to provide an inexpensive structure which may be assembled with a minimum number of parts, and to provide means for sealing the packing member with the outer periphery of the cage member.

Another object of the invention is to provide a seal including spacer members for the packing having their opposite edges in contact with the retainer member.

Other objects and advantages of the invention will be more apparent from the following description taken in connection with the accompanying drawing, in which.

Figure 1:
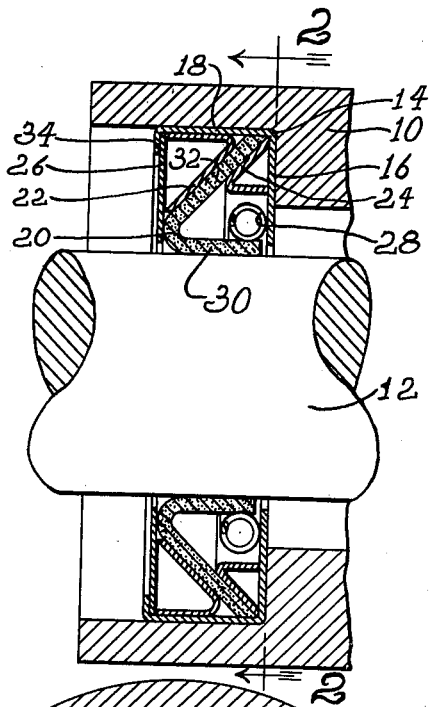
Fig. 1 is a longitudinal sectional view through a housing illustrating the improved seal in section and surrounding a centrally located shaft, the latter being shown in elevation.
Figure 2:
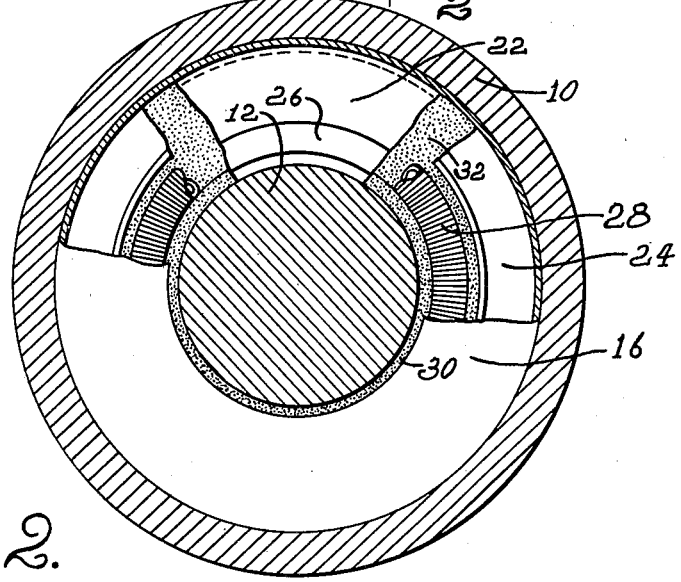
Fig. 2 is a sectional view on line 2—2 of Fig. 2 showing an end view of the seal, a portion thereof being broken away and in section.

Referring to the drawing, the seal is adapted to be inserted in a housing 10 in encompassing relation to a centrally located shaft 12. The seal consists of a cup-shaped housing 14 having a radially extending flange 16 and an axially extending flange 18 forming the outer periphery of the cup, a packing member 20, spacers 22 and 24, a washer 26, and a coil spring 28.

The packing member 20 has a radially extending flange 30 and a diagonally extending flange 32 extending from the juncture of the flanges 16 and 18 to the opposite side of the seal adjacent the shaft 12. The spacers 22 and 24 are substantially V-shaped, the spacer 22 having one of its walls in engagement with the inner periphery of the flange 18 and its other wall extending diagonally in engagement with the diagonally extending flange 32 of the packing 20. The spacer 24 has one of its walls extending diagonally in engagement with the inner wall of the diagonally extending flange 32 and its other wall substantially parallel to the axis of the shaft 12 and spaced radially from the axially extending flange 30 of the packing 20. The spacer 24 has both of its free ends in engagement with the radially extending flange 16 and both free edges of the spacer 22 are in contact with the washer 26. The latter is also in contact with the packing 20 at a point adjacent the juncture of the flanges 30 and 32.

When the parts are assembled within the cup 14 as illustrated, the outer edge of the flange 18 is bent radially inwardly, as shown at 34, applying a pressure axially of the seal to force the parts into tight engagement and preventing relative movement thereof. The spring 28 surrounds the outer periphery of the flange 30 and forces it into sealing engagement with the shaft 12.

It will be noted that the packing 20 is substantially V-shaped and is held in position by substantially V-shaped spacers, one of which is larger than the other, the smaller one providing a space for the coil spring 28 held between one of the spacers and the packing.

Various changes, including the size, shape and arrangement of parts, may be made without departing from the spirit of the invention and it is not my intention to limit the scope thereof other than by the terms of the appended claims.

What I claim is:

1. A self-contained seal for insertion in a housing surrounding a shaft comprising a centrally apertured sheet metal cup provided with an annular peripheral portion and an integral radially extending flange portion at one edge of the annular peripheral portion, a centrally apertured washer spaced axially from the radially extending flange of said cup in engagement with the free edge of said peripheral portion, a packing member in the space between said radially extending flange and said washer having an annular axially extending flange and an outward diagonally extending flange extending from the juncture of the radial flange and annular peripheral portion of said cup to the inner edge of said washer, metallic angular stampings at the opposite sides of the outward diagonally extending flange of said packing in pressure engagement with said washer and the radially extending flange of said cup respectively, and a coil spring around the outer periphery of the axially extending flange of said packing.

2. A self-contained seal comprising a centrally apertured sheet metal cup provided with an annular peripheral portion and an integral radially extending flange portion at one edge of the annular peripheral portion, a centrally apertured washer spaced axially from the radially extending flange of said cup in engagement with the free edge of said peripheral portion, a packing member in the space between said radially extending flange and said washer having an annular axially extending flange and an outward diagonally extending flange extending from the juncture of said radial flange and annular peripheral portion of said cup to the inner edge of said washer, and annular spacing members at the opposite sides of the diagonally extending flange of said packing substantially V-shaped in cross section with both free edges thereof in engagement with the inner face of said washer and the inner face of said radially extending flange respectively.

DONALD A. BOYD.